United States Patent [19]

Kudo et al.

[11] 3,935,153
[45] Jan. 27, 1976

[54] PROCESS FOR PREPARING STYRENE RESINS CONTAINING POLYESTER PLASTICIZERS

[75] Inventors: Teizo Kudo; Yoshio Hashizume; Masatoshi Mikumo; Masanori Itoh, all of Saitama, Japan

[73] Assignee: Daicel Ltd., Osaka, Japan

[22] Filed: Apr. 10, 1975

[21] Appl. No.: 566,787

Related U.S. Application Data

[63] Continuation of Ser. No. 378,255, July 11, 1973, abandoned.

[30] Foreign Application Priority Data

July 31, 1972 Japan............................ 47-76591

[52] U.S. Cl.......... 260/31.6; 260/31.8 DR; 260/873
[51] Int. Cl.²........................................... C08K 5/11
[58] Field of Search ........ 260/873, 31.6 R, 31.8 DR

[56] References Cited
UNITED STATES PATENTS

| | | | |
|---|---|---|---|
| 3,577,480 | 5/1971 | Thorpe | 260/873 |
| 3,644,587 | 2/1972 | Finberg | 260/880 R |
| 3,725,332 | 4/1973 | Carrock | 260/880 R |

*Primary Examiner*—Paul R. Michl
*Attorney, Agent, or Firm*—Woodhams, Blanchard and Flynn

[57] ABSTRACT

Molding compositions having improved properties for low-pressure, low-shear molding techniques are prepared by carrying out a two-stage polymerization of an initial mixture comprising a polymerizable monomer selected from the group consisting of (1) a polymerizable aromatic monoalkenyl monomer or (2) a mixture of such aromatic monoalkenyl monomer with another polymerizable monovinyl monomer; in the presence of a butadiene rubber elastomer under bulk polymerization conditions, followed by suspension polymerization conditions; the process being characterized by the incorporation into the initial mixture of 1 to 10 wt. %, based on the polymerizable monomers, of a straight chain saturated polyester having an average molecular weight of 1,000 to 50,000.

10 Claims, No Drawings

PROCESS FOR PREPARING STYRENE RESINS CONTAINING POLYESTER PLASTICIZERS

This is a continuation of application Ser. No. 378,255, filed July 11, 1973 now abandoned.

BACKGROUND OF THE INVENTION

1. Field of the Invention

This invention relates to a process for preparing a rubber-containing, styrene-type resin from which molded products of sufficient strength can be obtained, even when the resin is molded by a low-shear molding technique.

2. Description of the Prior Art

Powder molding techniques are known in the art in which molded products are formed under low-pressure and low-shear conditions by melting a resin powder composition and forming it by any of a variety of known methods such as rotation molding, the rock-and-roll process, the Heisler process, the Engel process and the sinter process.

This powder molding technique is a rapidly developing field and possesses numerous economic advantages for molding large-size products. It is generally applicable to a large variety of thermoplastic compositions, and the plastic materials that can be molded by it are not restricted except by their ability to be formed into a powder or a liquid. Examples in recommended use include HI (high impact) polystyrene and ABS resin compositions as well as such thermoplastics as polyethylene, polyvinyl chloride, polystyrene and cellulose acetate.

Nevertheless, in general whenever HI polystyrene or ABS resin compositions are subjected, for example, to rotation molding to form large molded products or products of complicated configuration, there are often obtained defective products, characterized by the presence of particles that failed to become molten, unsatisfactory surface finish, incomplete casting into slits and voids of the mold, and the existence of numerous unwanted openings or cavities in the molded products. It is also disadvantageous that when the molding temperature is increased to improve the fluidity and the properties of casting into slits and voids or improving the surface finish, the molded products are severely colored, resembling the appearance of having been scorched.

Furthermore, even when molded under the most favorable conditions, for example by regulating the particle size of the resin composition and using carefully designed molds, the products made from HI polystyrene or ABS resin compositions tend to have unacceptably low intrinsic impact resistance, and are unacceptably brittle.

ABS resin compositions and HI polystyrene resin compositions are characterized by a complex two-phase structure in which rubber is dispersed in a hard, brittle matrix continuous phase. Unlike polyethylene and polyvinyl chloride compositions which are characteristically of a homogeneous structure, the ABS resin compositions and HI polystyrene resin compositions do not lend themselves to powder molding techniques.

Nearly all of ABS resins and HI polystyrenes are molded by the injection molding process or the extrusion molding process. In those processes, the resins are rendered molten, blended sufficiently under high shearing conditions, and then are charged in a metallic mold through a nozzle under a high pressure, or are extruded. The resulting molded products have excellent impact resistance characteristic of ABS resins and HI polystyrenes containing rubber component which is present for the purpose of imparting toughness to the hard, brittle resins. In contrast, according to the rotation molding process, the molded products are obtained with minimal blending effect and pressure, because the molding is carried out by rotating the resin-charged metallic mold at a relatively slow speed with heating.

ABS resin and HI polystyrene which have a characteristic two-phase structure containing a considerable amount of a rubber component and which have been prepared by a graft polymerization reaction have very complicated melt viscosity characteristics. It may be supposed, further, that in a powder molding process wherein very little shearing force or pressure is applied, control of the molding properties of the resin is difficult, and that the mechanical properties of the two-phase structure of the resulting product are changed, unlike the molded products obtained by the injection molding or extrusion molding process. In fact, in many cases, the impact resistance of powder-molded products obtained from general ABS resins or HI polystyrenes is far lower than that of injection-molded products and the reinforcing effect of the rubber component is not realized sufficiently.

Thus, unlike polyethylene or polyvinyl chloride, ABS resin and HI polystyrene are not satisfactory when employed in the powder molding process.

It is known that straight chain, saturated polyesters of relatively low molecular weights are used conventionally as modifying agents for plastic products such as by blending them with polyvinyl chloride. These polyesters, if incorporated in an analogous way, by blending with the resin, in ABS molded products, do not improve its mechanical properties, particularly the impact resistance, even though the fluidity of the resin composition is increased to some extent. Thus, when such a polyester was added to ABS resin particles as described in detail below, and the blended mixture subjected to the powder molding process, the moldability or impact resistance of the molded product was not improved at all, and the product was brittle.

SUMMARY OF THE INVENTION

The present invention provides a process for polymerizing a resin which exhibits excellent moldability and high impact strength in the powder molding process by a bulk-suspension two-stage polymerization technique from a solution or mixture prepared by dissolving or mixing a butadiene rubber elastomer in or with (1) an aromatic monoalkenyl monomer or (2) a mixture of an aromatic monoalkenyl monomer and a polymerizable monovinyl monomer, to obtain a polymer, characterized in that 1-10 wt. %, based on the weight of the aforementioned polymerizable monomers, of a straight chain saturated polyester having an average molecular weight of 1,000–50,000 is incorporated in the polymerization system prior to the polymerization.

Stated otherwise, the present invention is based on the discovery that, if a straight chain saturated polyester having an average molecular weight of 1,000–50,000 is incorporated in the polymerization system prior to the polymerization, the polyester acts as a polymer plasticizer to improve the moldability and to increase the impact strength of the molded products obtained by the powder molding process. These effects are remarkably better than the effects obtained when the polyester is merely blended with a previously formed HI polystyrene or ABS resin.

We have found that, surprisingly, an excellent molded product can be obtained by the powder-molding process by employing a powder composition comprising rubber-modified, impact-resistant resin particles obtained by the bulk-suspension two-stage polymerization of a polymerization reaction mixture into which was previously incorporated said polyester, and that the impact resistance of the molded product is improved remarkably to a value equal to that of an injection molded product.

It is to be noted particularly that the straight chain saturated polyester used in the invention must be incorporated into the polymerization system prior to the initiation of the bulk polymerization. If the polyester is incorporated into the polymerization system after the completion of the bulk polymerization but before the suspension polymerization, the beneficial effect is not obtained.

It is further to be noted that the effect of the straight chain polyesters described above is unique among substances ordinarily regarded as plasticizers. For example, as polymer plasticizers similar in several respects to the straight chain saturated polyesters, there can be mentioned polystyrene, styrene-acrylonitrile copolymer, poly-α-methylstyrene and polybutene, all of relatively low molecular weights. In tests employing those plasticizers, no improved effect could be obtained. Further, conventional low molecular weight plasticizers such as dibutyl phthalate, tricresyl phosphate and dioctyl adipate did not exhibit an improved effect comparable to that obtained using the straight chain, saturated polyesters.

Although the reasons for this unexpectedly improved effect are not fully known yet, probably, by incorporating a straight chain, saturated polyester into the polymerization system prior to the bulk-suspension two-stage polymerization of a rubber-modified, impact-resistant resin such as ABS resin or HI polystyrene, the polyester acts subtly or delicately during the formation of the two-phase structure comprising the dispersed rubber component and the continuous resin component phase to improve the affinity between the rubber phase and the resin phase. It is further probable that, if the resulting suspended resin particles are subjected to the powder molding treatment, the polyester acts as a polymer plasticizer to provide excellent moldability, and that the blending operation by a high shearing force improves the adhesive power of the suspended resin particles even under powder molding conditions (i.e. when low pressure is applied). Further, the fluidity is also improved in this connection to yield an excellent compact molded product of two-phase structure and also to exhibit a high impact resistance.

On the other hand, the moldability and particularly the impact resistance of the powder molded product are not improved at all by incorporating the straight chain saturated polyester into the polymerization system not previously, but rather, for example, after the completion of the formation of the two-phase structure before the suspension polymerization stage or by blending the rubber-modified, impact-resistant resin particles with the polyester after polymerization is completed, followed by the powder molding operation.

As previously stated, the reasons for the unexpected beneficial effect of the invention are not as yet fully understood.

The reasons therefor may be that, even if the polyester in the form of a solid powder or liquid is incorporated and thereby dispersed in the rubber-modified resin particles, it is difficult to distribute the polyester throughout the resin particles uniformly and it cannot be expected to exert the desired action of the polyester upon the internal structure of the resin particles having a two-phase structure. However, by incorporating the polyester in the polymerization system before the bulk polymerization stage begins, the polyester is present during the step of forming the two-phase structure and consequently the polyester is contained uniformly in all of the resulting suspended particles to exhibit the excellent effect thereof.

The monomers and elastomers employed in the process of the present invention can be selected from known materials in accordance with conventional practice.

As the aromatic monoalkenyl monomer used in the present invention, styrene is most preferred. Other various substituted styrene derivatives such as α-methylstyrene and p-methylstyrene and mixtures thereof with styrene can also be used. Monovinyl monomers used in the form of a mixture with the aromatic monoalkenyl monomers if necessary or desired are, for example, acrylonitrile, methacrylonitrile, acrylic acid esters and methacrylic acid esters. However, the monovinyl monomers that can be used are not limited to those listed above, but one or more of polymerizable compounds having $>C=C<$ group can be used. The acrylic acid esters and methacrylic acid esters are preferably those of aliphatic alcohols of 1 to 12 carbon atoms and of polyhalogenated phenols. The aromatic monoalkenyl monomers should be present at least 30 percent by weight, preferably more than 50 % by wt., in the mixture of polymerizable monomers.

As the butadiene rubber elastomers, there can be used those employed generally for the preparation of impact resistant polymers. Among them, rubbers such as polybutadiene and butadiene-styrene copolymer especially those of a relatively high stereospecificity prepared by solution polymerization process in the presence of lithium or an organometal catalyst are particularly preferred.

No particular limitation is imposed on the proportion of the monomer or monomers to the rubber elastomer. In general, 2–40 parts by weight of rubber elestomer is used, per 100 parts by weight of the aromatic monoalkenyl monomer or the mixture of aromatic monoalkenyl monomer and polymerizable monovinyl monomer.

As the straight chain saturated polyester of an average molecular weight of 1,000–50,000 which is a critical ingredient of the invention, there can be mentioned a condensate or a dibasic acid and a glycol or a ring-opened polymer of a cyclic lactone. More particularly, there can be mentioned various polyesters known generally as plasticizers of polyvinyl chloride obtained by the condensation reaction of dibasic acids of up to 10 carbon atoms such as adipic acid, sebacic acid, azelaic acid and phthalic acid with glycols preferably alkylene glycols of 2 to 6 carbon atoms in the alkylene chain such as ethylene glycol, propylene glycol and 1,3-butylene glycol. Further, there can be used modified polyethylene terephthalate mainly comprising terephthalic acid and ethylene glycol and polyesters prepared by ring-opening-polymerization of lactones of hydroxyalkanoic acids of up to 12 carbon atoms in the alkyl chain such as, for example ε-caprolactone, pivalolactone and lauric lactone.

In the polymerization according to the present invention, the polyester is incorporated in the polymerization system before the bulk polymerization begins. Therefore, the polyester should not exert a detrimental influence on the polymerization reaction for the preparation of the rubber-modified, impactresistant resin. If, for example, an unsaturated polyester is used in place of the straight chain saturated polyester characterizing this invention, in the process of the present invention, a serious detrimental influence is exerted on the polymerization reaction and there is obtained a final product of very poor molding property like that of a thermosetting resin and of very low impact strength. Thermosetting alkyd resins are also not suitable for the process of the invention, because they are insoluble in polymerizable vinyl monomers mainly comprising aromatic monoalkenyl monomers.

The straight chain saturated polyester is used preferably in an amount of 1–10 wt. %, based on the total weight of polymerizable monomers (net including the elastomer). If the straight chain saturated polyester is used in a larger amount, the deflection temperature under heat of the resin product is lowered and, on the other hand, if it is used in a smaller amount, the full beneficial effect thereof is not achieved. Although low molecular weight plasticizers such as phthalic acid esters, phosphoric acid esters and stearic acid esters can be used together with the straight chain saturated polyesters, the use of the plasticizers of this type in a large amount is not preferred for the reasons described above.

A description will be made of a typical bulk-suspension two-stage polymerization technique employed in the present invention. Suitable amounts of the elastomer and straight chain saturated polyester are dissolved or mixed in or with the polymerizable monomers mainly comprising aromatic monoalkenyl monomer to obtain a solution or mixture. To this solution or mixture is then added a known organic peroxide catalyst as radical initiator, a known mercaptan as a molecular weight-regulating agent and other known additives as desired. If necessary, a small quantity of water is further added thereto to increase the thermal conductivity. Bulk polymerization is performed with vigorous stirring until 10–40% of the polymerizable monomers is converted to the polymer, and the rubber dispersion phase is formed. The resulting viscous polymer is then added to water containing a dispersing agent suspended therein. The suspension polymerization is then effected with stirring and with heating to a predetermined temperature as described below.

The type and amount of the polymerization initiator and molecular weight regulating agents used in the reaction are not critical and form no part of this invention. Usual or conventional, known initiators and regulating agent can be used generally. If necessary or desired, they can be added accumulatively in the first bulk polymerization step and then in the second suspension polymerization step.

Similarly the suspension or dispersing agents employed are not critical and they form no part of the present invention. For example, protective colloids such as polyvinyl alcohol and sodium polyacrylate and fine powders of inorganic salts such as calcium phosphate and magnesium hydroxide can be used in accordance with conventional practice.

Further, the polymerization temperature conditions form no part of the present invention. Preferably, the bulk polymerization in the first stage is effected at 60°–100°C and the suspension polymerization in the second stage is effected at 60°–140°C, in accordance with conventional practice.

The bulk-suspension two-stage polymerization of the process of the invention is most preferably carried out in a manner described in U.S. patent application Ser. No. 262,618, filed June 14, 1972.

Namely, the conditions are as follows:

1. Polybutadiene or butadiene/styrene copolymer prepared by solution polymerization in the presence of an organometal polymerization catalyst is used as the rubber elastomer.

2. A liquid paraffin, one or more of phthalic acid esters and stearic acid esters and a straight chain saturated polyester (an indispensable component of the invention) are incorporated in the polymerization system prior to the polymerization.

3. The bulk polymerization in the first stage is carried out at a temperature below 100°C, preferably 65°–80°C.

4. The suspension polymerization in the second stage is carried out at a temperature preferably not higher than 120°C.

The process of the present invention will be further described by reference to the following illustrative examples. In the examples, parts are given by weight.

The evaluations of the resin compositions, molding and measurement of physical properties were effected in the following manners:

1. The polymer in the form of beads which passed through a 30 mesh sieve in the examples and comparative examples was shaped by a rotation molding process into cylinders of 200 mm diameter, 200 mm length and 10 mm wall thickness, and into balls of 82 mm diameter and 3 mm thickness by using a rotation molding machine of the McNeal type. The molding conditions were as shown in Table 1.

Table 1

| Metallic mold | | Rotation molding conditions Heating | | | | Cooling water spraying |
|---|---|---|---|---|---|---|
| Shape | Material | Temp. | Time | Rotation | Revolution | |
| Cylinder | Iron | 320°C | 25 mins. | 4 rpm | 8 rpm | 8 mins. |
| Ball | Aluminum | 320°C | 10 mins. | 8 rpm | 2 rpm | 4 mins. |

2. The cylindrical molded product obtained in (1) was cut into the following test pieces and the physical properties thereof were measured by the following tests:

Tensile strength and elongation: JIS No. 2 dumbbell thickness 3 mm (Tensile velocity; 5 mm/min.)

Izod impact strength: JIS K 6871, thickness 6.4 mm.

Deflection temperature under heat: JIS K 6871 127 ×

12.7 × 6.4 mm (Fiber stress 18.56 kg)

3. In the drop test of the ball obtained in (1), the ball was perforated and was filled with water through the perforation (total weight; about 290 g) and dropped onto a concrete floor. The height at which breaking of the ball occurred was measured.

4. The resin product was shaped into pellets by using an extruder (cylinder temperature 230°C) and the following test pieces were prepared from the pellets by using an injection molding machine (cylinder temperature 220°C). The physical properties of the test pieces were measured by the following tests:

Tensile strength and elongation: JIS K 6871, thickness 3 mm; (Tensile velocity; 5mm/min.).

Izod impact strength: JIS K 6871, thickness 12.7 mm.

Deflection temperature under heat: The same as in (2).

5. The metl viscosity of the extruded pellets of the resin was measured by using a Kohka (Highpolym. Chem. Lab.) — System flow tester at 240°C under an extrusion pressure of 40 kg/cm². The nozzle used had a size of 1 mm (diameter) × 10 mm.

EXAMPLE 1

75 Parts of styrene monomer, 25 parts of acrylonitrile, 13 parts of Tufdene 2000A (styrene/butadiene = 25/75 copolymer obtained by solution polymerization; a product of Asahi Kasei K.K.), 0.15 part of benzoyl peroxide, 0.08 part of dicumyl peroxide, 0.35 part of t.-dodecylmercaptan, 3 parts of butylbenzyl phthalate and 3 parts of polycaprolactone (PCL-700; a product of Union Carbide Corporation) of an average molecular weight of 40,000 were mixed together. The mixture was stirred until the rubber was completely dissolved. Thereafter, 10 parts of deionized water were added thereto. The mixture was heated in a polymerization vessel provided with a powerful stirring mechanism at 72° C for 5 hours under stirring. The reaction was carried out until about 25% of the monomers were converted to the polymer. In another vessel, an aqueous phase comprising 100 parts of deionized water and 3 parts of magnesium hydroxide was prepared. Said polymerization reaction mixture was added to the aqueous phase and the temperature of the thus-obtained suspension was elevated from 65°C to 120°C over about 1.5 hours. The reaction was carried out at this temperature under stirring for 5 hours. After cooling, the resulting polymer slurry was washed with hydrochloric acid and water, subjected to centrifugal separation and dried.

COMPARATIVE EXAMPLE 1

The polymerization was carried out in the same manner as in Example 1 except that polycaprolactone was not used.

COMPARATIVE EXAMPLE 2

113 Parts of the resin particles obtained in Comparative Example 1 were dry-blended with 3 parts of the finely pulverized polycaprolactone used in Example 1.

The resins thus obtained in Example 1 and Comparative Examples 1 and 2 were molded and the physical properties thereof were measured. The results are shown in Table 2.

The injection molding products of the resins obtained in Example 1 and Comparative Examples 1 and 2 had almost the same physical properties. However, the rotation molding product of the resin obtained in Example 1 was superior with respect to uniformity of the thickness and smoothness of the internal surface and Izod impact strength and the results of the drop test thereof were far superior to those of Comparative Examples 1 and 2.

The test results are as follows:

Table 2

Physical properties of injection molding products and rotation molding products

Physical properties of injection molding products

| Resin | Melt viscosity ×10⁻³ poise | Strength at yield point Kg/cm² | Strength at breaking point Kg/cm² | Elongation at breaking point % | Izod Impact strength with notch Kg·cm/cm | Deflection temperature under heat °C |
|---|---|---|---|---|---|---|
| Example 1 | 3.8 | 333 | 324 | 77 | 12 | 71 |
| Comparative Example 1 | 4.1 | 409 | 345 | 64 | 12 | 73 |
| Comparative Example 2 | 3.9 | 351 | 318 | 70 | 12 | 71 |

Physical properties of rotation molding products

| Strength at yield point Kg/cm² | Strength at breaking point Kg/cm² | Elongation at breaking point % | Izod impact strength with notch Kg·cm/cm | Izod impact strength without notch Kg·cm/cm | Deflection temperature under heat °C | Ball drop test |
|---|---|---|---|---|---|---|
| 232 | 209 | 47 | 8 | 40 | 69 | 9m no breakage |
| — | 251 | 17 | 3 | 9 | 73 | 2m breakage |
| — | 231 | 14 | 2 | 6 | 70 | 2m breakage |

EXAMPLE 2

Polymerization was carried out in the same manner as in Example 1 except that in place of polycaprolactone there was used the same amount of a polyester of average molecular weight of 3,000 (Adeka-Sizer PN 350; a product of Adeka-Argus Corp.) prepared from adipic acid and 1,3-butylene glycol.

COMPARATIVE EXAMPLE 3

Polymerization was carried out in the same manner under the same conditions as in Example 2 except that the polyester was added to the system not prior to the initiation of the polymerization but rather immediately before the completion of the bulk polymerization in the first stage. Namely, the polyester was added to the system after the polymerization had been carried out at 72°C for 4-5/6 hours under heating, the bulk polymerization was then continued at 72°C for a further period of 10 minutes and suspension polymerization was carried out thereafter.

EXAMPLE 3

Polymerization was carried out in the same manner as in Example 1 except that the polycaprolactone was replaced with modified polyethylene terephthalate (Vylon 300; a product of Toyo Boseki K.K.) of an average molecular weight of about 20,000.

The resins obtained in Examples 2 and 3 and Comparative Example 3 were molded and the physical properties thereof were measured. The results are shown in Table 3.

The resins had excellent moldability in all cases. The rotation-molding products of the resins in Examples 2 and 3 had a high impact resistance but that of Comparative Example 3 was low.

rated polyester having an average molecular weight of 1000 to 50,000, said straight chain saturated polyester being selected from the group consisting of polyesters obtained by the condensation reaction of dibasic acids having up to 10 carbon atoms with alkylene glycols having 2 to 6 carbon atoms, and polyesters prepared by the ring-opening-polymerization of lactones of hydroxyalkanoic acids having up to 12 carbon atoms in the alkyl group.

2. The process of claim 1, in which the monoalkenyl monomer is a member of the group consisting of styrene, $\alpha$-methylstyrene, p-methylstyrene, and mixtures thereof, and the monovinyl monomer is a member of the group consisting of acrylonitrile, methacrylonitrile, acrylic acid esters and methacrylic acid esters of aliphatic alcohols of 1 to 12 carbon atoms and of polyhalogenated phenols.

3. The method of claim 2, in which the bulk polymerization is carried out at 60°C to 100°C and the suspension polymerization is carried out at 60°C to 140°C.

4. The method of claim 3, in which the butadiene rubber elastomer is a member of the group consisting of polybutadiene and a butadiene/styrene copolymer.

5. The method of claim 4, in which the monoalkenyl monomer is styrene, and the other monovinyl monomer is acrylonitrile.

6. The method of claim 5, in which the straight chain saturated polyester is polycaprolactone.

Table 3

| Resin | Tensile strength and elongation | | | Izod impact strength | | Ball drop test | Deflection temperature under heat |
|---|---|---|---|---|---|---|---|
| | Strength at yield point Kg/cm² | Strength at breaking point Kg/cm² | Elongation at breaking point % | with notch Kg·cm/cm | without notch Kg·cm/cm | | °C |
| Example 2 | 271 | 225 | 49 | 9 | 34 | 13m no breakage | 71 |
| Comparative Example 3 | — | 243 | 15 | 3 | 10 | 2m breakage | 71 |
| Example 3 | 204 | 185 | 41 | 12 | 43 | 9m no breakage | 74 |

The embodiments of the invention in which an exclusive property or privilege is claimed are defined as follows:

1. In a method for producing a molding composition suitable for use in low-pressure low-shear molding techniques, which comprises carrying out a bulk-suspension two-stage polymerization of (A) monomer selected from the group consisting of (1) an aromatic monoalkenyl monomer and (2) a mixture of said aromatic monoalkenyl monomer with another monovinyl monomer, in the presence of (B) a butadiene rubber elastomer, the improvement which comprises incorporating in the polymerization mixture before the bulk polymerization stage, (C) from 1 to 10 wt. %, based on said monomer component (A), of a straight chain satu- 7. The method of claim 5, in which the straight chain saturated polyester is a polyester of adipic acid and 1,3-butylene glycol.

8. The method of claim 5, in which the straight chain saturated polyester is modified polyethylene terephthalate.

9. The method of claim 1, in which the aromatic monoalkenyl monomers are contained in an amount of at least 30 % by weight in the mixture of said aromatic monoalkenyl monomers with another monovinyl monomers.

10. A novel molding composition suitable for low-pressure low-shear molding techniques, the product of the process of claim 1.

* * * * *